United States Patent

De Bie

[11] Patent Number: 5,831,946
[45] Date of Patent: Nov. 3, 1998

[54] PLAYER FOR READING AUDIO SIGNALS AND/OR VIDEO SIGNALS FROM A MEDIUM

[75] Inventor: Boele De Bie, Kwai Chung N. T., Hong Kong

[73] Assignee: U.S. Philips Corporation, New York, N.Y.

[21] Appl. No.: 701,282

[22] Filed: Aug. 22, 1996

[30] Foreign Application Priority Data

Aug. 22, 1995 [EP] European Pat. Off. .............. 95202255

[51] Int. Cl.⁶ ................................................ G11B 17/22
[52] U.S. Cl. ................................................ 369/33; 369/32
[58] Field of Search ................................ 369/33, 32, 47, 369/48, 54, 58

[56] References Cited

U.S. PATENT DOCUMENTS

| | | | |
|---|---|---|---|
| 4,535,437 | 8/1985 | Hiranuma | 369/223 |
| 4,706,233 | 11/1987 | D'Alayer de Costemore | 369/33 |
| 4,841,505 | 6/1989 | Aoyagi | 369/32 |
| 4,872,067 | 10/1989 | Okatani | 358/341 |
| 4,878,129 | 10/1989 | Yasuda et al. | 358/342 |
| 5,122,999 | 6/1992 | Kimura et al. | 369/32 |
| 5,365,502 | 11/1994 | Misono | 369/33 |
| 5,438,423 | 8/1995 | Lynch et al. | 358/335 |
| 5,463,601 | 10/1995 | Yanagisawa | 369/32 |

FOREIGN PATENT DOCUMENTS

| | | |
|---|---|---|
| 0632453A2 | 1/1995 | European Pat. Off. . |
| 4302086A1 | 7/1993 | Germany . |
| 7296484 | 11/1995 | Japan ........................................ 369/33 |

*Primary Examiner*—Tan Dinh
*Attorney, Agent, or Firm*—Michael E. Belk

[57] ABSTRACT

A player for reading audio and/or video information from a medium, for example a Compact Disc, which includes a memory for storing position information so that after interruption of the operation of the player reading can be resumed in a position related to the part being read at the time of interruption. The player also includes means for repeating, upon resumption of reading, a part of the information read prior to the instant of interruption.

17 Claims, 1 Drawing Sheet

PLAYER FOR READING AUDIO SIGNALS AND/OR VIDEO SIGNALS FROM A MEDIUM

BACKGROUND OF THE INVENTION

1. Field of the Invention

This invention relates to a player for reading audio signals and/or video signals from a medium, which player includes resume means for resuming, after an interruption, the reading at a first location on the medium, which location is related to a part being read at the instant of interruption.

2. Discussion of the Related Art

A player of this kind is known from U.S. Pat. No. 4,527,265. The known player is suitable for playing a disc with information by means of a laser read unit. The known player has a facility for saving the instantaneous position of the read unit upon switching off. The playing of the disc can thus be resumed as from the position at the time of switching off. To a user of such a player this means that, for example in the case of a disc containing music, after switching on, the music is resumed as from the point at which it was interrupted. The known player has a non-volatile memory in which position information of the read unit is stored and offers the possibility of setting the read unit, after an interruption, to the position stored in the memory upon resumption of playing.

SUMMARY OF THE INVENTION

It is an object of the invention to provide a player of the kind set forth in which the resumption of the reproduction of the audio and/or video information is improved. To this end, the player in accordance with the invention is characterized in that it includes means for repeating a part of predetermined length of the audio signals and/or video signals which is situated substantially directly preceding the first location when reading is resumed. The invention is based on the recognition of the fact that when information, notably video, is resumed at the point at which it was interrupted, information will be lost to the user. This is because, after the resumption of reproduction, the user requires some time to understand the information presented and relate it to the information directly preceding the interruption. The player in accordance with the invention repeats the last part of the information directly preceding the interruption and hence allows the user to become immersed again in the situation at the instant of interruption. As a result, the user will understand the new information presented after the point of interruption and no information will be lost. The player in accordance with the invention can also be advantageously used in the case of audio information. Repeating the last piece of music directly preceding the interruption allows the user to become immersed again in the relevant passage, upon resumption.

An embodiment of the player in accordance with the invention is characterized in that it includes a memory for storing first position information of the part being read at the instant of interruption of the player, and the repeat means are arranged to repeat the audio signals and/or video signals on the basis of the first position information. As a result of the storage of position information concerning the part of the audio signals and/or the video signals being read, the part to be repeated can be simply localized on the medium.

An embodiment of the player in accordance with the invention is characterized in that the repeat means are arranged to calculate second position information of a second location as from where the part of the audio signals and/or video signals to be repeated is situated, and that the resume means are arranged to resume the reading at the second location. In this embodiment repeating the audio and/or video information read directly before the instant of interruption is performed by reading the relevant audio and/or video information again from the medium. On the basis of a compression factor, if any, and the quantity of audio and/or video information per unit of length of the medium, therefore, the repeat means of the player determine the magnitude of the part of the medium to be repeated. This indicates, in conjunction with the information concerning the location of interruption, the location of the medium where the part to be repeated is present and the player resumes reading at that location. Repeating the audio and/or video information by reading it again from the medium constitutes a simple principle which can be readily and inexpensively implemented.

An embodiment of the player in accordance with the invention is characterized in that it includes adjusting means for adjusting the predetermined length of the part of the audio signals and/or video signals to be repeated. The length of the audio and/or video information to be repeated is preferably adjustable. The length can then be adapted to the nature of the audio and/or video information and to the user of the player.

An embodiment of the player in accordance with the invention is characterized in that the player includes start means for detecting a condition of the interruption and for activating the repeat means in dependence on said condition. By checking, upon starting, how the player has been interrupted during a previous session, it can be determined whether a part of the audio and/or video signals on the medium should be repeated.

These and other aspects of the invention will be apparent from and elucidated with reference to the embodiments described hereinafter.

DETAILED DESCRIPTION OF THE PREFERRED EMBODIMENTS

Figure 1:
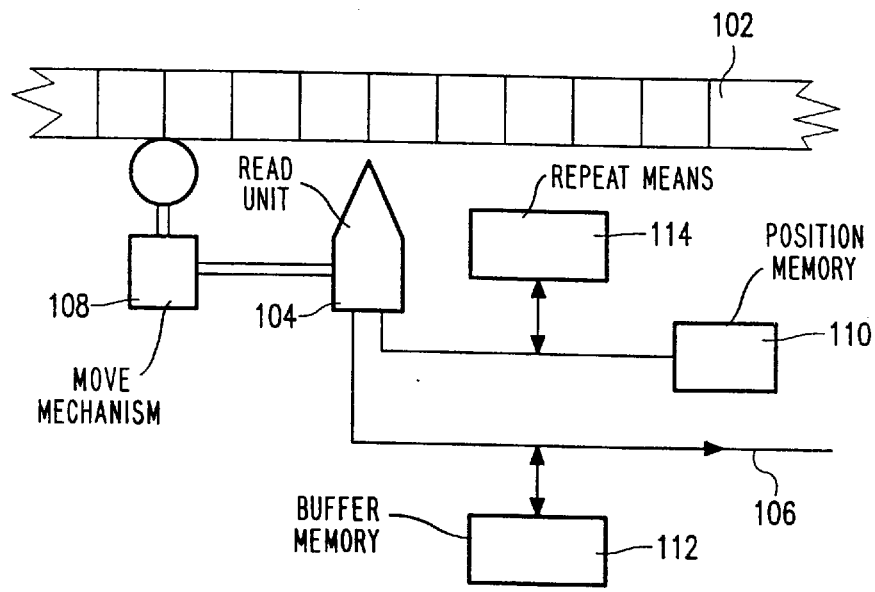
FIG. 1 shows diagrammatically the construction of a player in accordance with the invention.

FIG. 1 shows diagrammatically the construction of a player in accordance with the invention. The audio and/or video information is linearly stored on a medium 102. The information on the medium can be addressed in a given manner. This can be realized by including addresses in blocks of information on the medium and by reading the addresses simultaneously with the audio and/or video information. It is alternatively possible to address the information by way of a relative, physical position on the medium, for example by counting the length of the medium read as from a given reference point. The player includes a read unit 104 which reads the information from the medium and presents it as a stream 106 for further use. The player includes a mechanism 108 for moving the medium and the read unit relative to one another in order to read successive information from the medium. The invention can be used in a player in which the medium is formed by a tape. The tape is then guided past the read unit so as to read the information therefrom. The tape may contain blocks of digitally stored audio and/or video information, all information blocks having their own address. The invention can also be used for other types of players with other types of media. For such other types it always holds that the medium must be suitable for the storage and reading of a linear stream of audio and/or video information; moreover, the information on the medium must be addressable. The invention can thus also be used for a player with a medium in the form of a disc. An example in this respect is an optical disc such as the Compact Disc on which the information is stored in the form of a long spiral. The disc is read by rotating the disc past the read unit and by radially displacing the read unit so as to track the spiral. Another example is a magnetic disc on which the information is stored in circles subdivided into sectors. This disc also rotates past the head and the head can be radially displaced so as to read successive information. The invention can also be used for a player including a RAM (Random Access Memory) or a ROM (Read-Only Memory). The information is then stored in the cells of the memory and the read unit is formed by the drive mechanism whereby the memory is read. During reading no physical movement of the medium or the read unit takes place, but each time a next memory cell is addressed and read, in a continuous fashion.

If the player is interrupted during the reading of the medium, the stream 106 to the user of the player will cease. Players are known which, after resumption, continue the reading at the point where the interruption took place. A player of this kind, using a medium in the form of an optical disc, is described in the cited U.S. Pat. No. 4,527,265. To this end, in this player a position of the read unit relative to the medium is stored in a memory 110. After resumption, the memory 110 is read and the position is restored, after which the reading of the medium continues. A player utilizing a medium in the form of a tape can simply save the relative position of the read unit and the medium by leaving the position of the tape unchanged after interruption. Notably if the interruption has taken place some time ago, a user will require some time to understand the information presented after resumption. For example, when a video film is concerned, the user will experience the images after resumption as incoherent and unintelligible because the user no longer knows the context at the time of interruption. It will take some time before the user again knows the context well enough to understand the information presented. As a result, the user loses the information presented immediately after resumption. The player in accordance with the invention repeats, after resumption, the part of the information presented to the user immediately before the interruption. During said repeat the user can become immersed again in the film and at the instant at which actually new information from beyond the point of interruption is presented, the user will be able to understand this information. One possibility of repeating the information is to buffer the stream 106 in the memory 112 in such a manner that this memory continuously stores the most recently read part of the information. Upon resumption after an interruption, first the contents of the memory 112 are then presented to the user and the reading of the medium is continued at the point of interruption.

A particular embodiment of the player in accordance with the invention does not require the memory 112. In this embodiment the information read directly prior to the instant of interruption is repeated by reading the relevant information again from the medium. To this end, the player includes repeat means 114 which determine the magnitude of the part of the medium to be repeated, said determination being performed on the basis of a compression factor, if any, and of the quantity of information per unit of length of the medium. The repeat means subsequently determine, on the basis of the magnitude and the information concerning the location of the interruption, the location on the medium in which the part to be repeated is present. The player then resumes the reading of the medium, at the location thus determined, by moving the read unit and the medium to the desired position relative to one another. For example, in the case of a player with a medium in the form of a tape this can be simply realized by rewinding the tape to the desired location. In the case of a medium in the form of a disc, this can be performed by moving the read unit to the radial position relative to the disc wherefrom the desired information can be directly read upon resumption.

Figure 2:
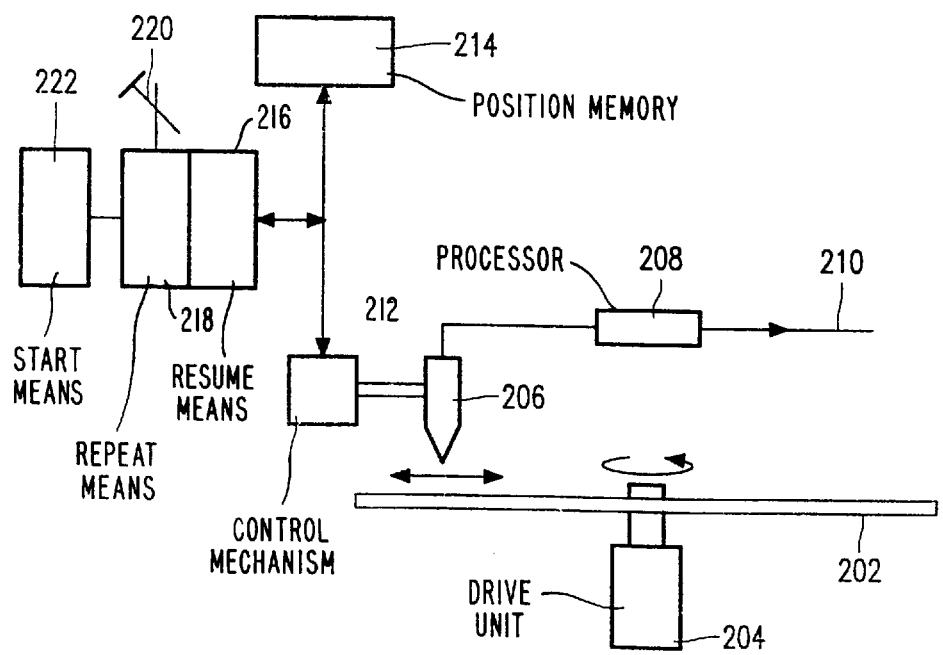
FIG. 2 shows diagrammatically the construction of a Compact Disc player in accordance with the invention.

FIG. 2 shows a Compact Disc player in which the invention is used. The disc may be a Compact Disc containing video information, the so-called video CD, but also a Compact Disc with audio. The information is stored on a Compact Disc 202 as a long spiral which extends outwards from the inside and the information on the spiral is subdivided into sectors. The Compact Disc player includes a drive unit 204 for rotating the Compact Disc underneath a read unit 206 at a speed such that the read unit reads 75 sectors per second. The stream of sectors read is presented, after processing in 208, if any, as a continuous stream of information 210 for use, for example, by a unit which converts the stream into video images for a user. The Compact Disc player includes a control mechanism 212 which ensures that the read unit tracks the spiral so that it can read the information. During the successive reading of the sectors on the Compact Disc, the control mechanism will gradually drive the read unit from the inside to the outside. Information concerning the instantaneous position of the read unit is stored in the memory 214. This may be the radial position of the read unit, but also the address of the last sector read because, considering the configuration of the compact disc, such an address can be converted into a radial position on the Compact Disc. The memory 214 may be constructed as a permanent memory which can save the contents also if the voltage is interrupted. This feature can be used in situations in which the Compact Disc player is completely disconnected from the supply voltage. Such a facility is not required in situations where a voltage permanently remains present in the Compact Disc player. The Compact Disc player also includes resume means 216 which are capable of reading the memory 214 and of controlling the control mechanism 212. The resume means may be conceived as a part of the program providing control and operation of the compact Disc player. The Compact Disc player also includes repeat means 218 which drive the resume means so as to repeat a part of the information read upon resumption of reading. The repeat means may also be conceived as part of the control program. The Compact Disc player may include an adjusting facility 220 for adjusting the desired duration of the piece of information to be repeated. The adjusting facility may be formed by a switch on the Compact Disc player which is set to one of a number of feasible positions by the user, each position corresponding to a respective repeat duration. The adjusting facility may also be conceived as a choice in a menu providing the control of the Compact Disc player. Other implementations, however, are also feasible.

When the Compact Disc player is started, it is checked how it has been interrupted. To this end, the Compact Disc player includes start means 222 which check the interrupt condition. It may concern a customary termination, i.e. after the Compact Disc has been sufficiently read, and in that case starting will not involve steps concerning the resumption of reading. However, it may also concern a temporary interruption of the reproduction of the Compact Disc, so that at a later instant the reproduction of the same Compact Disc must be resumed. In that case the starting operation involves activation of the repeat and resume means by the start means 222 in order to ensure that the reading of the Compact Disc is resumed at the correct point. Such a temporary interruption may be implemented as the switching off of the player by means of an on/off button, but also as a specific "off-with-resume" function. Such a function can be implemented in various ways: for example, as a separate button on the player, as a choice in the menu control of the player, if provided, or as a preferred setting specified by the user. How the player has been interrupted can be detected upon starting by inspecting the memory 214. If this memory does not contain information, the player has been interrupted in a manner which does not necessitate resumption of the reading out of the Compact Disc. The presence of information in the memory, however, means that the reading of the present Compact Disc should be resumed.

On the basis of the desired duration of the piece of information to be repeated, possibly adjusted via adjusting facility 220, the repeat means 218 determine the magnitude of the part of the spiral on the Compact Disc which is to be repeated. This magnitude can be determined from the known length and duration of a sector on the Compact Disc and from the known distribution of the sectors on the Compact Disc. On the basis of the position information stored in the memory 214 and of the calculated magnitude, the repeat means 218 subsequently determine the position at which the read unit should resume reading. The control mechanism 212 drives the read unit to this position and the read unit resumes the reading of the information therein.

I claim:

1. A player for reading from a medium data signals in the form of audio signals, video signals, both audio and video signals, which player comprises:

resume means for resuming, after an interruption, the reading at a first location on the medium, which first location is related to a first part of the data signals being read at the instant of interruption; and repeat means for repeating a second part of an approximately constant predetermined length or time of the respective data signals which is situated substantially directly preceding the first location when reading is resumed.

2. A player as claimed in claim 1, wherein:

the player further comprises a memory for storing first position information of said first part of the data signals; and said repeat means include means to repeat said second part of the respective data signals on the basis of said first position information.

3. A player for reading from a medium data signals in the form of audio signals, video signals, both audio and video signals, which player comprises:

resume means for resuming, after an interruption, the reading at a first location on the medium, which first location is related to a first part of the data signals being read at the instant of interruption; and repeat means for repeating a second part of the respective data signals which is situated substantially directly preceding the first location when reading is resumed; and wherein:

the repeat means calculate second position information of a second location as from where the second part of the respective data signals is situated; and the resume means resumes the reading at the second location.

4. A player as claimed in claim 1, wherein:

the player further comprises adjusting means for adjusting the predetermined length of the second part of the respective data signals.

5. A player as claimed in claim 1, further comprising:

means for detecting a condition of the interruption; and means for activating the repeat means in dependence on said condition.

6. A player for reading from a medium data signals in the form of audio signals, video signals, both audio and video signals, which player comprises:

resume means for resuming, after an interruption, the reading at a first location on the medium, which first location is related to a first part of the data signals being read at the instant of interruption; and repeat means for repeating a second part of the respective data signals which is situated substantially directly preceding the first location when reading is resumed; and wherein:

the player further comprises a memory for storing first position information of said first part of the data signals;

said repeat means repeat said second part of the respective data signals on the basis of said first position information;

the repeat means comprises means to calculate position information of a second location as from where the second part of the respective data signals is situated, and the resume means comprises means to resume the reading at the second location.

7. A player as claimed in claim 2, wherein:

the player further comprises means for adjusting the predetermined length of the second part of the respective data signals.

8. A player as claimed in claim 3, wherein:

the repeated second part is of a predetermined length;

the player further comprises means for adjusting the predetermined length of the part of the second respective data signals.

9. A player as claimed in claim 6, wherein:

the repeated second part is of a predetermined length;

the player further comprises means for adjusting the predetermined length of the second part of the respective data signals to be repeated.

10. A player as claimed in claim 2, further comprising:

means for detecting a condition of the interruption; and means for activating the repeat means in dependence on said condition.

11. A player as claimed in claim 3, further comprising:

means for detecting a condition of the interruption; and means for activating the repeat means in dependence on said condition.

12. A player as claimed in claim 4, further comprising:

means for detecting a condition of the interruption; and means for activating the repeat means in dependence on said condition.

13. A player as claimed in claim 6, further comprising:

means for detecting a condition of the interruption; and means for activating the repeat means in dependence on said condition.

14. A player as claimed in claim 7, further comprising:
means for detecting a condition of the interruption; and
means for activating the repeat means in dependence on said condition.

15. A player as claimed in claim 8, further comprising:
means for detecting a condition of the interruption; and
means for activating the repeat means in dependence on said condition.

16. A player as claimed in claim 9, further comprising:
means for detecting a condition of the interruption; and
means for activating the repeat means in dependence on said condition.

17. A player as claimed in claim 3, wherein:
the player further comprises a memory for storing first position information of said first part of the data signals; and
said repeat means repeat said second part of the respective data signals on the basis of said first position information.

* * * * *